May 29, 1962  G. W. DOVE  3,036,697
SPECTACLE CASE
Filed March 20, 1961
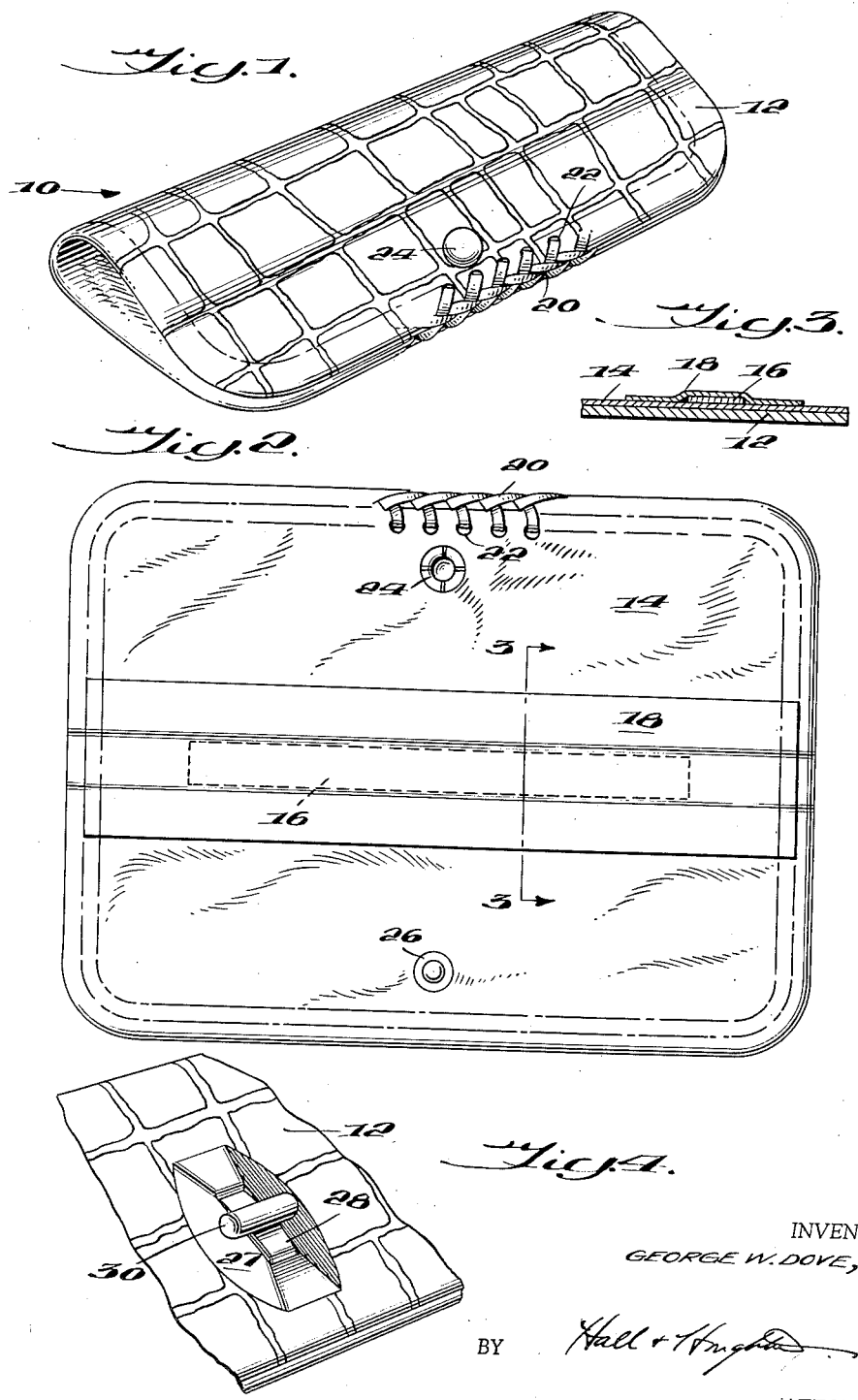
INVENTOR
GEORGE W. DOVE,
BY  Hall & Hughton
ATTORNEY

United States Patent Office 3,036,697
Patented May 29, 1962

3,036,697
SPECTACLE CASE
George W. Dove, Section 43, Kecoughton, Va.
Filed Mar. 20, 1961, Ser. No. 97,072
5 Claims. (Cl. 206—5)

The present invention relates generally to spectacle cases and more particularly to an improved type of spectacle case which is pliable yet properly protects spectacles from damage.

Previously in this art cases of this type have been constructed with pockets, clamps, straps, or other retaining means for assuring retention of the spectacles within the case. However, this always results in manufacturing difficulties when constructing the case as well as inconvenience to a user who may desire to remove his spectacles from his case in a simple and efficient manner, or who may be handicapped and unable to perform manipulative operations with his hands.

Also, these cases have either had no reinforcement whatsoever, or have been provided with such an excess of reinforcement that the case when completed was bulky and heavy and extremely inconvenient for carrying around in a pocket or the like. For example, some cases have been constructed entirely of relatively stiff material for protecting the glasses or spectacles and for retaining its shape as a container.

With these defects of the prior art in mind it is an object of the present invention to provide a very simple case for glasses and the like which is easily constructed and extremely convenient in use.

Another object of this invention is to produce a case for glasses wherein a single reinforcement is provided along that portion of the case which corresponds to the bridge of the glasses so that the lenses will not be damaged by lateral forces on the case.

A further object of the invention is to provide a case for glasses which is sufficiently flexible as to be conveniently carried about in a pocket and which when so carried will not hamper the bending or sitting movements of a person so carrying the case.

Yet, a further object of the invention is to provide a case for glasses wherein the only means for retaining the glasses within the case is the fastener for maintaining the case in closed position, so that when the case is opened the glasses may be immediately removed therefrom without the necessity for any unclamping or special manipulations of the glasses themselves.

Still a further object of the invention is to provide a case for glasses having an interior lining which is sufficiently soft that the case may be used on a desk or the like and the glasses even with the lenses face down may be rested thereon.

Still a further object of the invention is to provide an extremely simple and inexpensive device and yet one which is exceedingly effective for the purposes for which it is designed.

The foregoing objects and others ancillary thereto are accomplished according to preferred embodiments of the invention, wherein a body of pliable sheet material is provided having a frame bar in the form of an elongate rectangular planar strip of stiff material connected along a medial portion thereof and extending parallel to the side edges of the body and dividing it into two leaves. A soft lining covers the interior of the body and a cover strip overlies the body and the frame bar so that said bar is an integral part of the case. The lining is made of cushioning material so as to protect the glasses or spectacles from damage and the frame bar proper may be flexed somewhat in a direction normal to the planar faces of its sides so that the entire case is flexible and may bend somewhat. Detachable fastening means are provided on the leaves and are spaced from the frame bar to engage adjacent the bridge of a pair of eyeglasses therein to retain the glasses therein.

A pliable ornamental edging attaches the lining to the body as well as the cover strip, so that the parts are firmly assembled into a unitary structure. If desired the cover strip may have indicia provided thereon.

The novel features that are considered characteristic of the invention are set forth with particularity in the appended claims. The invention itself, however, both as to its organization and method of operation, together with additional objects and advantages thereof, will best be understood from the following description of specific embodiments when read in connection with the accompanying drawings, in which:

FIG. 1 is a perspective view of one embodiment of the invention illustrating the case in closed position with only a portion of the ornamental edging being shown for purposes of clarity;

FIG. 2 is a plan view of the interior of the case illustrated in FIG. 1;

FIG. 3 is a vertical sectional view taken substantially along the plane defined by line 3—3 of FIG. 2 and illustrating the mounting of the frame bar within the case, and FIG. 4 is a fragmentary view of another type of fastening means which may be used with the case.

Referring now more particularly to the drawings numeral 10 generally indicates the spectacle case comprising the present invention. This case is constructed of a sheet of pliable material 12 which may be leather, alligator, or the like, or some imitation thereof. Sheet 12 forms the outer covering of the case and as shown in FIG. 2 is rectangular in shape. An inner covering 14 of cushioning material is secured to the outer covering 12 by any suitable means, such as gluing, but must be soft so as not to scratch the surfaces of the glass lenses which will be disposed within the case.

A frame bar 16, which is a flat sheet of metal or other stiff material, is placed along the medial portion of the case parallel to the side edges of the case. The frame bar divides the case into two leaves which may be folded using the bar area as a hinge. It is shorter than the case in length and is disposed on top of cushioning layer 14 and secured in position by a cover strip 18 extending for the full length of the case and overlying the frame bar both in the longitudinal and in the lateral directions. The cover strip extends to the edges of the case. This strip 18 is secured to the cushioning material 14 by any suitable means, such as by gluing the two together. If desired the frame bar may be disposed between the flat sheet and the cushioning layer.

An ornamental edging 20 is provided by lacing a strip of leather or the like through openings 22 provided for the purpose. These openings extend through layers 12 and 14 along the entire periphery thereof and the lacing secures the two layers together around their entire periphery, as well as securing the ends of the cover strip thereto. This lacing not only secures the parts of the case together, and provides an eye-appealing edging, but also serves to substantially increase the life of the device since there are no free edges which may be pulled apart or worn apart, and the lacing material is much better adapted for taking wear along the edge than would be the edges of this case structure were they unprotected.

If desired metal edging and/or metal corners may be provided to hold the layers together and protect them from wear at their edges.

In one embodiment of the invention as shown in FIGS. 1 and 2 the case is closed by having the elements 24, 26 of a snap fastener secured to the side portions of the case but spaced outwardly from the frame bar a distance less than the distance between the bridge side of a pair of glasses and the other side thereof which has a U-shaped portion to fit the contour of a wearer's nose, whereby when the case is closed the glasses are firmly locked therein. The glasses obviously cannot fall out laterally because on one side the fabric is folded and on the other side the snap fastener secures the glasses therein. On the other hand the glasses cannot fall out lengthwise because the snap fastener is disposed in the U-shaped portion of the frames between the lenses, and lengthwise movement of the glasses therein is limited by the size of this U-shaped portion, since it will engage the snap fastener and prevent the glasses from falling out of the case.

Another embodiment of the invention is illustrated in FIG. 4 wherein the case per se is identical but a different and more positive locking turn-button fastener is used composed of an aperture element 27 and a base element 28 having a rotatable button or pin 30 mounted thereon, so that when the base and pin are passed through the aperture the pin may be rotated and disposed normal with respect to the longer axis of the opening. Thus, as illustrated in FIG. 4, the case cannot be opened without first turning the bar. In this embodiment it is impossible for the case to be accidentally opened.

From the preceding description the present invention including all of its benefits and advantages should be obvious. Frame bar 16 prevents crushing of the glasses. The case may be disposed as illustrated in FIG. 2, with its leaves opened into coplanar relation like an open book and used on a desk or the like so that a pair of glasses may be placed thereon and the case used as an eyeglass rest. Also, when the glasses are being worn the case may be placed in a person's pocket and even while a person is sitting there will be no damage to the case nor discomfort caused thereby, since the frame bar 16 is somewhat flexible in a direction normal to its planar sides, and thus the case will adapt itself to the curvature of the body when in bending, stooping or sitting positions. In addition the case is thin and not very bulky. The case may be opened and closed easily with one hand, even a weak hand, and is therefore especially advantageous to handicapped persons.

Since the cases are flat when opened like an open book, they may be stored or shipped in this condition with two cases having their cushioning layers abutting and the fasteners locking them together. Thus, the cushioning layers are kept clean, and the cases are flat and take up little space.

The foregoing is considered only as illustrative of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the appended claims.

What is claimed is:
1. A spectacle case comprising:
   (a) a frame bar in the form of a single elongated substantially rectangular planar strip of stiff material,
   (b) a body in the form of a generally rectangular sheet of pliable material,
   (c) said frame bar being secured flatwise to said body and extending transversely thereof generally parallel to and midway between opposite edges of said body and thus dividing said body into two-leaves extending from opposite edges of said frame bar,
   (d) said two leaves being free to open in normal use thereof into coplanar relation to each other whereby the entire case may lie on a supporting surface like an open book,
   (e) a matable pair of separable fastener members carried respectively by said leaves at locations spaced laterally from the midportion of said frame bar and from the midportion of the opposite edges of said body for mating engagement, when said leaves are folded together about the back afforded by said frame bar like the leaves of a closed book,
   (f) said mating engagement securing said leaves together solely in the region below the bridge area of a pair of spectacles positioned between said leaves with their top edges proximate to said frame bar.
   (g) said frame bar defining and stiffening the interior of said case for preventing crushing and bending thereof when said matable separable fastener members are so engaged, and
   (h) the said separable fastener members which secure said leaves together in said region below the bridge area constituting the sole means for holding said leaves together like a closed book, whereby said leaves open like an open book except when secured by the said fastener members.

2. A spectacle case according to claim 1, said frame bar being juxtaposed flatwise to said body, there being a cover strip of pliable material overlying and secured to said body with said frame bar interposed between said strip and said body 3. A spectacle case according to claim 1, said frame bar being juxtaposed flatwise to said body, there being a lining of cushioning material overlying and secured to said body with said frame bar interposed between said lining and said body.

4. A spectacle case according to claim 1, said frame bar being juxtaposed flatwise to said body, there being a lining of cushioning material overlying and secured to said body and a cover strip of pliable material overlying said lining and also secured to said body, with said frame bar interposed between said body and said lining in underlying relation to said cover strip.

5. A spectacle case according to claim 1, a lining of cushioning material overlying and secured to said body, a cover strip overlying and secured to said lining, said frame bar being disposed between said lining and said cover strip.

References Cited in the file of this patent
UNITED STATES PATENTS

| | | |
|---|---|---|
| 441,651 | Eyre | Dec. 2, 1890 |
| 1,891,233 | Lachter | Dec. 20, 1932 |
| 2,723,745 | McNeill | Nov. 15, 1955 |
| 2,913,100 | Carmichael | Nov. 17, 1959 |

FOREIGN PATENTS

| | | |
|---|---|---|
| 877,658 | Germany | May 26, 1953 |